United States Patent Office

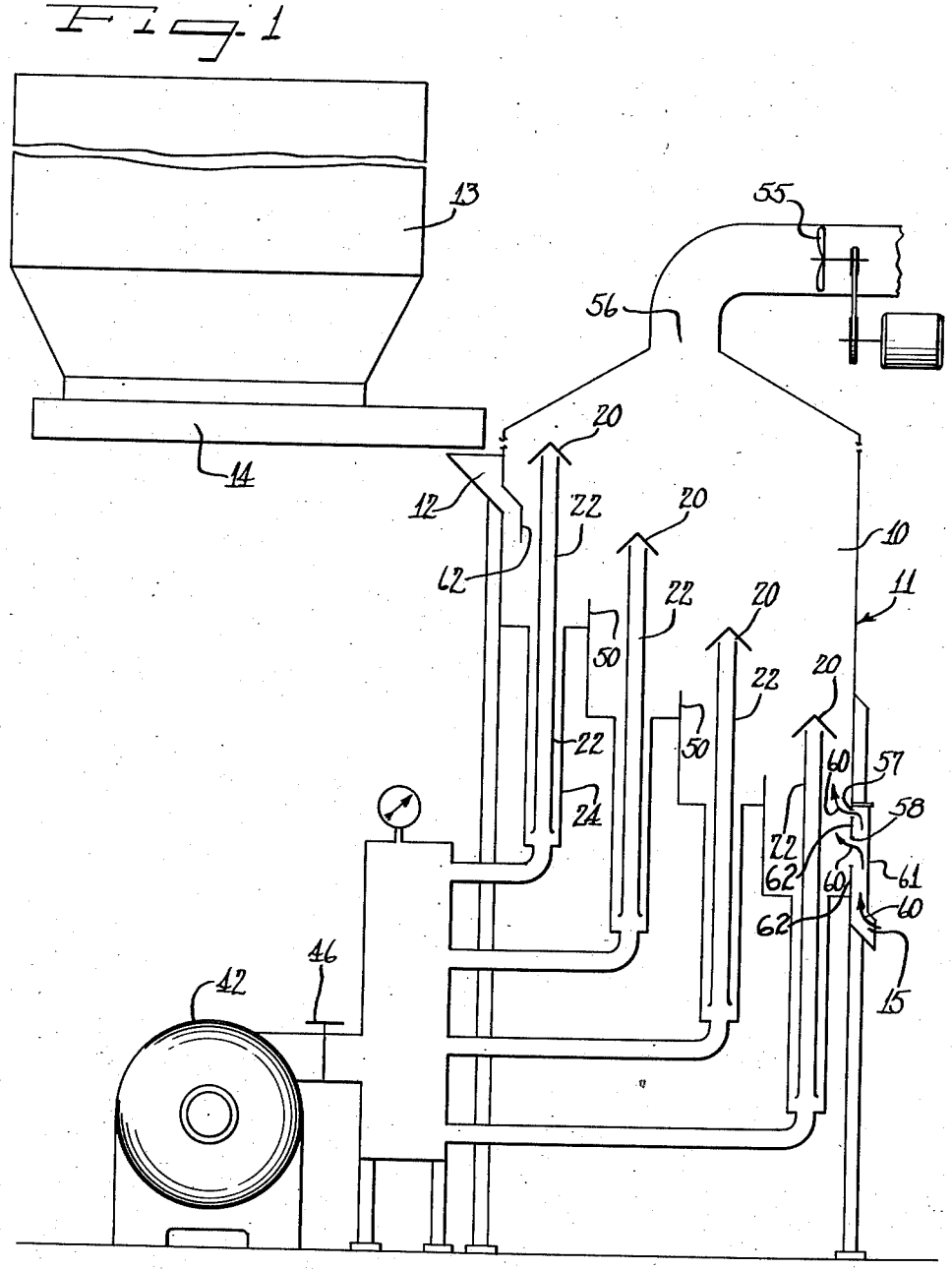

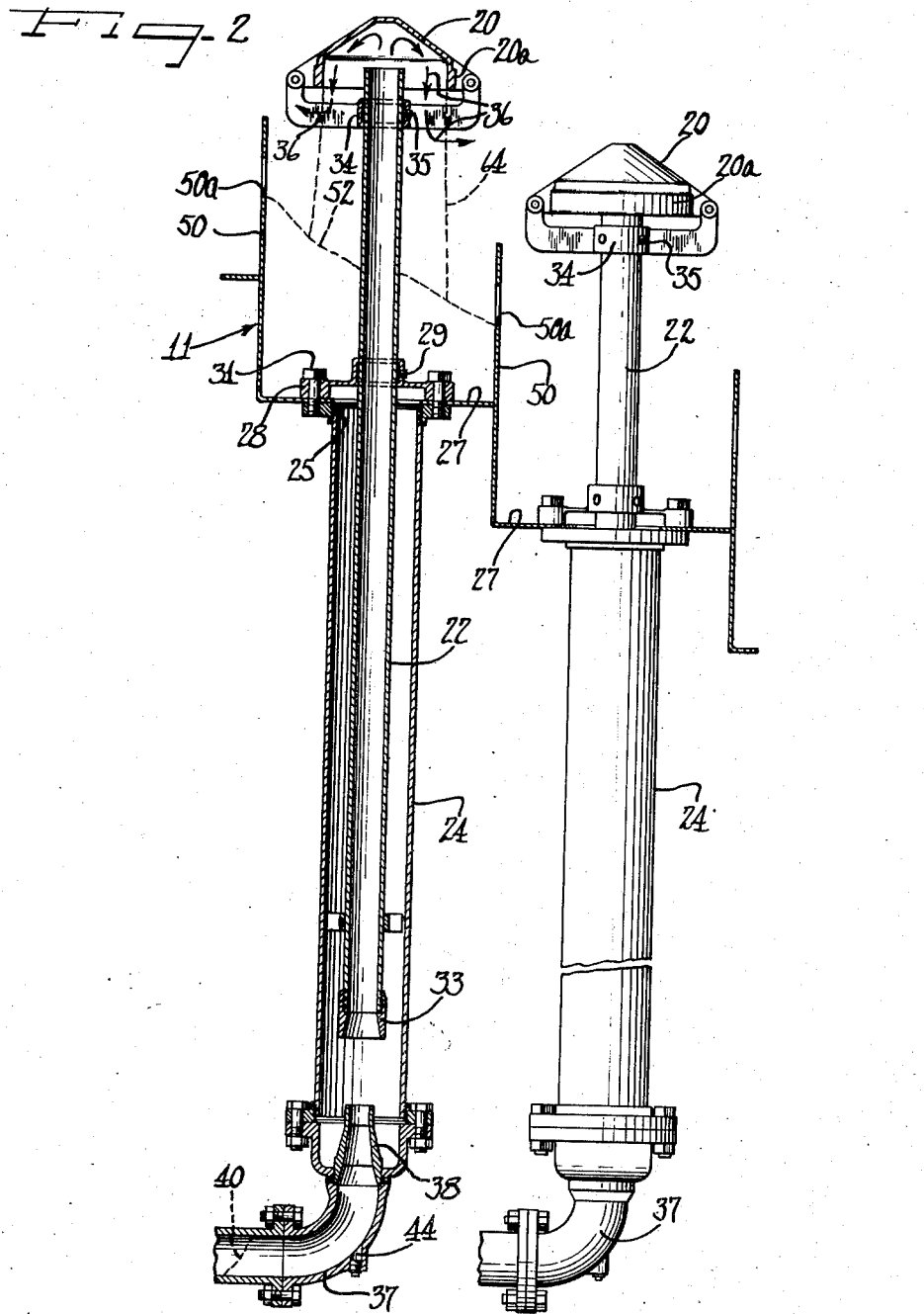

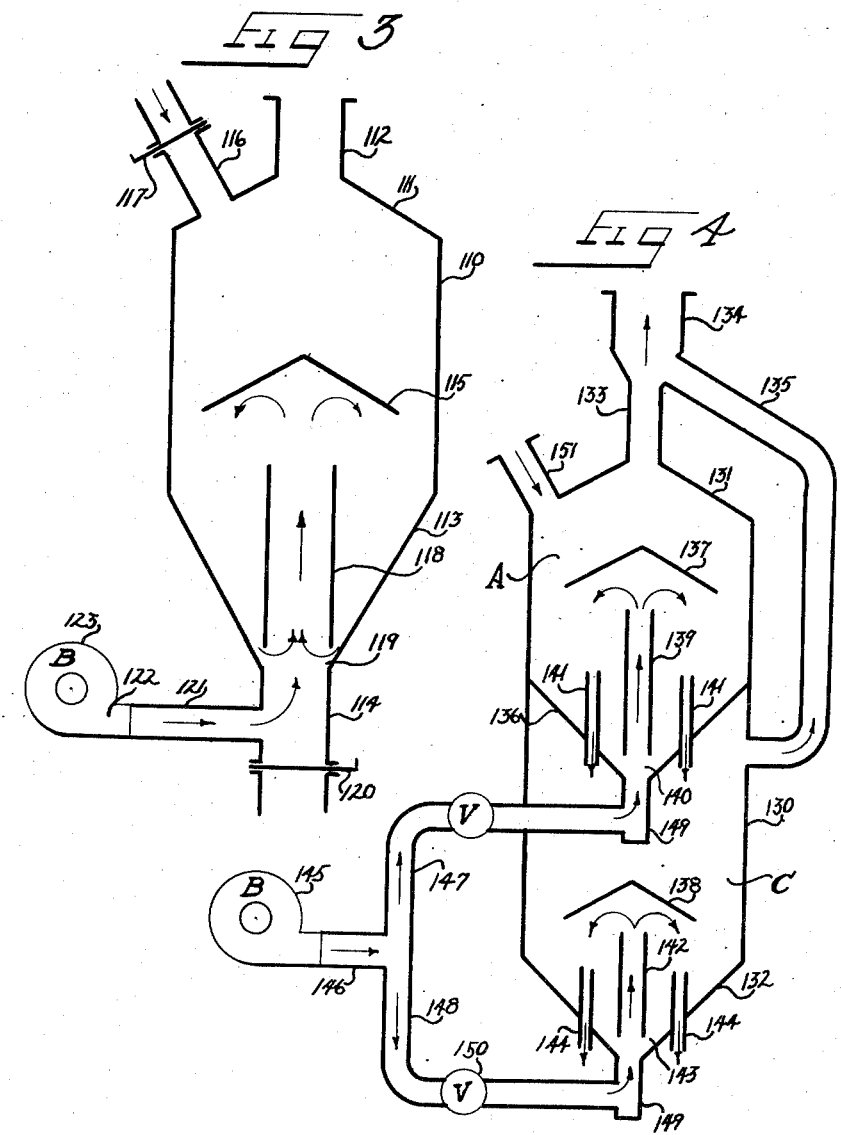

2,813,318
Patented Nov. 19, 1957

2,813,318

METHOD AND APPARATUS FOR TREATING GRANULAR MATERIAL

Walter Horth, Wilmette, Ill., assignor to Herbert Simpson Corporation, Chicago, Ill., a corporation of Illinois Application June 29, 1954, Serial No. 440,214

9 Claims. (Cl. 22—89)

This invention relates to a method and apparatus for treating granular materials, and particularly to a method and apparatus for reclaiming granular materials after the same have been used in foundry operations.

In conventional foundry practice, granular base materials, such as silica sand, zirconium sand etc. are coated with binder materials such as clays, cereals, resins and oils, so that the resultant mixture can be molded into definite shapes corresponding to the contours of the castings to be made.

These coatings are calcined or oxidized when coming in contact with the liquid metals and the base materials can only be reused economically after the coatings have been removed.

Up to now this had been done by three methods:

(a) Hydraulic reclamation, where the coatings are removed by scrubbing the materials in water.

(b) Thermal reclamation, which burns off the carbonaceous materials adhering to the sand grains.

(c) A combination of the hydraulic and thermal methods.

The above methods have been in very limited use for some 20 years, mainly because their economics do not provide an attractive margin if compared with the cost of new sand.

The present invention utilizes air as the sole conveying, scrubbing and fines removal medium, and provides a very substantial cost advantage over new sand. While previous attempts have been made to develop reclamation units utilizing air as the conveying medium, such attempts have never proved commercially practical.

The present invention represents the first commercially successful sand reclamation unit of this type.

By the method and apparatus of the present invention, it has been found possible to remove carbonaceous as well as non-carbonaceous coatings from the granular materials used in molding operations, thus eliminating the need for costly burning off of carbonaceous materials.

Further by the method and apparatus of the present invention, it has been found possible to control the extent of the scrubbing of the granular particles so as to leave desired amounts of coating materials on the reclaimed particles thus greatly reducing the amount of new materials which must be added to the particles in preparation for a further molding operation. For example, the amount of clay added to reclaimed facing sand has been reduced by 35% to 75% of the previously required amount. Additions of oil to reclaimed core sand have been reduced by 25% to 50%.

The method and apparatus of the present invention are effective in separating foreign scrubbed-off matter from the reclaimed material and produce reclaimed material having a uniformity of average particle size and other properties substantially as good or better than new material.

The apparatus and method of the present invention are further effective in producing more rounded particles.

It is also advantageous to treat new material by the method and apparatus of the present invention in order to roughen the surfaces thereof and thus to increase the adhesive properties between the granular materials and liquids or solid bodies used in bonding the same.

Other and further objects, features and advantages of the present invention will become more fully apparent from the following description taken in connection with the accompanying drawings, in which:

Figure 1 is a diagrammatic elevational view of a preferred apparatus for treating granular materials in accordance with the present invention;

Figure 2 is a vertical sectional view illustrating the construction of the apparatus of Figure 1;

Figure 3 is a schematic illustration of an alternative apparatus of the present invention for carrying out the method of the present invention; and Figure 4 is a schematic representation of a further alternative form of apparatus of the present invention for carrying out a modified form of the method of the present invention.

As shown on the drawings:

The present invention particularly concerns the treatment of granular materials usable in the molding or foundry art. Such materials include, for example, silica sand, zirconia sand, and olivine. Primarily the invention deals with a method and apparatus for removing substances which are mixed with the granular materials prior to use and the residues of which adhere to the sand or other particles after use. These substances include both carbonaceous and non-carbonaceous materials and may, for example, include oils, cereals, clays, resins and cements.

Additionally the present invention contemplates the treatment of granular materials such as above enumerated to knock off sharp projections and corners of the particles to produce materials composed of more rounded grains. The rounding of the grains is beneficial in affording increased flowability, better packing and higher green strengths.

Further it is contemplated that granular materials may be treated prior to their use in operations requiring bonding of the materials with liquids and powders. It has been found that such treatment roughens the surfaces of the grains to provide a more favorable surface for adhesion of liquids and solid bodies than the original polished surfaces found in many granular materials prior to use. Such treated materials when used in a molding operation provide higher green strengths and dry tensile properties for given amounts of oil and bonding materials, and thus require less of such materials, with a consequent savings in material costs.

A preferred embodiment of apparatus according to the present invention is illustrated in Figures 1 and 2 and comprises a material treating chamber 10 defined by a housing 11. The chamber may have an inlet 12 at one end for receiving material at a uniform and controlled rate from a storage bin 13 by means of a vibrating feed conveyor 14, and may have a spout 15 at the opposite end for discharging treated material from the chamber.

Material entering the chamber divides between two parallel series of treating cells or units, one such series being shown in Figures 1 and 2. Cells of each series may be identical so that only one cell need be described in detail. Referring to Figure 2 it will be observed that each treating cell comprises a downwardly concave conical target 20 having a generally depending annular lip 20a. Material is directed against the target 20 by conduit means 22 disposed vertically below the target and extending into a cylindrical casing 24 threadedly secured in alignment with an opening 25 in a generally horizontal material supporting surface 27 of the housing.

The conduit means 22 comprises a tube vertically adjustably secured in the casing 24 by means of a bracket 28 and set screws 29, the bracket being secured by threaded fastening means 31 for ready removal of the tube 22 with its bracket in the upward direction in replacing the tube. At its lower end the tube carries an entry piece 33 while at its upper end it adjustably carries the target 20 by means of a bracket 34 and set screws 35. The target is preferably positioned so that the upper end of the tube 22 terminates substantially within the confines of the vertical lip 20a thereof to provide a restricted high velocity path for air flowing up the tube 22 and outwardly between the exterior of the tube and the lip 20a as indicated by the arrows 36.

The lower end of the casing 24 is provided with a curved gas inlet fitting 37 having a nozzle 38 for establishing a flow of gas upwardly through the tube 22. The upper end of the tube 22 is spaced above the nozzle to provide an inlet for delivering material into the gas stream. In order to provide proper entrainment of material in the gas stream the nozzle preferably terminates in an orifice smaller than the cross-section of the tube 22, and the height of the tube above the nozzle is adjusted for high density of entrained material in the gas stream. Such high density is desirable to maintain sufficient material at the underside of the target to prevent undue wear on the target and to efficiently use the high velocity gas. Generally a relatively large spacing between the tube 22 and the nozzle 38 is required for this purpose, the spacing being large in comparison to the diameter of the tube 22 as shown.

The tube should be of sufficient length to allow acceleration of the granular material up to approximately the velocity of the air stream in the tube, and it has been found that to this end the tube should be at least approximately four feet in length and is shown as six feet in length.

The bracket 28 includes a plurality of radially extending arms which are spaced apart so that openings are provided between the arms to permit the flow of material from the barrier 50 into the passage formed between the tube 22 and the casing 24.

When the apparatus is not in operation, material will flow into the nozzle fitting 37 to a limit position indicated generally by the dotted line 40 in Figure 2. The output of the blower 42 (Figure 1) may be of the order of 2100 cubic feet of air per minute at four pounds pressure, and such an output is generally inadequate to displace the material at 40. Therefore, a secondary compressed air jet may be introduced at 44 (Figure 2) under a pressure of from 80 to 120 pounds per square inch to start the flow of gas against the target 20. The output of the blower 42 is adjustable by means of a valve 46 to insure proper scrubbing of the material without excessive reduction in the average grain size of the material.

As will be seen in Figure 2, barrier means 50 is interposed between adjacent treating cells of a series, and such means may comprise a partition plate having openings 50a to provide passages for material from the region of one treating cell to the region of the next succeeding treating cell in a series. The generally horizontal material supporting surface 27 of each cell serves to retain a protective cushion of material below each target 20 as indicated by the dotted line 52. This cushion of sand on the surface 27 receives material impelled downwardly from the target due to the reverse flow of gas indicated at 36. The cushion not only protects the surfaces of the housing from wear but provides a secondary scrubbing of the material. It will be observed that as material is progressively fed into the first treating cell the level thereof will reach the line 52 and thereafter a portion of the material impelled against the target will flow through the passage 50a into the next succeeding treatment cell under the impetus of gravity and the velocity imparted to the material by the reverse air stream at 36. The material is thus automatically moved through successive cells, the supporting surfaces 27 and passages 50a of succeeding cells being progressively lower, and the rate of flow of material through the apparatus is controlled by the rate of introduction of material at the inlet 12.

Referring to Figure 1, it will be observed that exhaust means 55 is provided for drawing gas through the outlet 56 at the top of the chamber. It has been found that by providing apertures 57 adjacent outlet openings 58 at the discharge end of the casing and by operating the exhaust means 55 at a substantially greater capacity than the blower 42, air is drawn into the chamber through the spout 15 in a counter flow path to the path of flow of the discharging material, and that this counter flow stream of air greatly enhances the removal of fines from the reconditioned material. The path of flow of the secondary air into the chamber is indicated by the arrows 60 in Figure 1. Since discharge casing 61 encloses air inlet opening 57, incoming air must flow past material being discharged through the spout 15. The capacity of the exhaust means 55 is preferably at least approximately 50% greater than the capacity of the blower 42 to insure a substantially secondary flow of air into the chamber. The inlet baffle 62 has been found to increase the secondary flow indicated at 60 and thus improve the efficiency of fines removal.

It will be understood that initial fines removal takes place at the target 20, where the primary gas stream indicated at 36 flows laterally from the target and through the cylindrical curtain of material indicated at 64 flowing downwardly from the target. The high velocity of the gas stream resulting from the close spacing of the lip 20a to the end of the tube 22 enhances the fines removal action.

For obtaining a quality of sand compatible with use in oil bonded core sand mixtures, an 8-cell scrubber (two series of four cells in parallel) should receive approximately one to two tons of material per hour from the conveyor 14. For less critical molding or facing sand mixes and where it is advantageous to leave part of the clay on the grain, the 8-cell scrubber may be operated at a rate of from three to six tons per hour. The rate of delivery of material to the apparatus controls the average number of scrubbing cycles to which the material is subjected in passing through the apparatus, and a delivery rate of one ton of material per hour, for example, provides an average of approximately 60 scrubbing cycles.

In Figure 3 reference numeral 110 refers generally to a cylindrical vessel having a frusto-conical upper wall 111 merging with a centrally located discharge passage 112 and a lower frusto-conical wall 113 merging with a central inlet conduit 114.

Mounted in the vessel intermediate the upper and lower walls 111 and 113, respectively thereof, is a generally conical, concavo-convex baffle or dished target 115. A charging conduit 116 is also provided in the upper wall 111 for introducing material into the vessel 110, the conduit 116 having a slidable flow control valve 117. The lower wall 113 carries an upstanding blow pipe 118 preferably spaced from the bottom wall 113 to provide an annular recycling opening 119. The inlet conduit 114 is provided with a slide valve 120, generally similar to the valve 117 hereinbefore referred to, and the inlet conduit 114 above the valve 120 communicates with a side-opening blower conduit 121 communicating with the discharge side 122 of a conventional centrifugal-type blower 123.

The charging conduit 116 is connected to a source of molding sand and, preferably, with a furnace or similar heating means in which the molding sand has been heated to remove carbonaceous materials therefrom by forced draft combustion, as is well known in the art. The slide valve 117 is provided to control the introduction of sand into the vessel 110, and it will be seen that sand from the charge opening 116 is free to fall into the vessel to lie against the lower frusto-conical wall 113 thereof.

The blower 123 is adapted to discharge a current of air into the inlet pipe 114, this air passing upwardly through the blow pipe 118 against the concave undersurface of the target 115 and about the target upwardly through the outlet opening 112. The spent air exhausted through the outlet opening 112 is preferably passed through a dust arrester (not shown) for the separation of fine clays, bentonite, and silica particles removed from the sand particles, as will be hereinafter more fully described.

It will be seen that the sloping frusto-conical wall 113 accommodates sliding of the sand downwardly therealong for passage through the annular space 119 into the inlet conduit 114. Thus, sand is gravity fed directly into the counter-gravity air blast traveling upwardly through the inlet pipe 114 and the blow pipe 118. The sand blast is strong enough to lift sand particles thus entering the conduit upwardly through the blow pipe into contact with the target 115. Further, the concave undersurface of the target 115 is effective to retain sand particles thereagainst, so that a portion of the sand blown upwardly through the blow pipe 118 by the fluid stream is retained in contact with the undersurface of the target. Thus, sand carried upwardly by the air stream contacts the target and the sand held thereagainst.

After the sand-air stream has struck the target 115, spent air is vented about the target upwardly through the outlet opening 112. However, the velocity of the spent air is greatly reduced after contacting the target by virtue of the relatively large capacity of the vessel 110 beyond the target, and the spent air is not sufficiently strong to buoy up the sand therein. The sand thus falls under the influence of gravity downwardly against the frusto-conical lower wall 113, with the sand again being recharged through the annular space 119 into the air blast traveling upwardly through the blow pipe 118. Therefore, the sand is recycled for another pass at the target 115 and the sand particles retained against the undersurface thereof.

The sand particles charged into the vessel 110 are typically coated with non-carbonaceous material which forms an envelope enclosing each individual sand particle, or groups of particles, and this envelope is split and/or ruptured by abrasive contact of sand particles buoyed by the air stream and contacting the target and the other sand particles thereon. In this manner, an effective and violent scrubbing action is exerted upon the sand particles, and after a plurality of passes against the target 115, the sand is relatively free of non-carbonaceous materials. The non-carbonaceous materials, such as fine clays, bentonites and silica particles which are removed or scrubbed from the sand, are in finely divided form and are relatively less dense than the sand itself, so that these foreign particles are buoyed up and air-floated by the spent air for exhaustion through the outlet opening 112. The treated sand, of course, flows to the bottom of vessel 110 after the blower 123 is cut off and may be removed through conduit 114 under control of valve 120.

Thus, it will be seen that that form of the invention illustrated in Figure 3 is effective to remove the undesirable non-carbonaceous materials from the sand grains for air-flotation with spent air, and also for cooling the sand by contacting the same a plurality of times with a moving current of air.

In that embodiment of the invention shown in Figure 4, reference numeral 130 refers generally to a cylindrical vessel provided with frusto-conical upper and lower end walls 131 and 132, respectively. The upper end wall 131 is provided with a centrally located upwardy projecting outlet conduit 133 which communicates with an upper enlarged exhaust conduit 134. An additional outlet conduit 135 also communicates with the exhaust conduit 134 and with a central portion of the vessel 130.

The interior of the vessel 130 is divided into a pair of superimposed sand treating chambers denoted by reference characters A and C, respectively. The chambers A and C are divided from one another by means of a generally frusto-conical centrally located partition wall 136 located intermediate the chambers and contacting the side walls of the vessel immediately above the point of juncture of the vessel 130 and the additional outlet conduit 135. Thus, it will be seen that the upper chamber A is vented to the exhaust conduit 134 through the outlet conduit 133, while the lower vessel C is similarly vented to the exhaust conduit 134 through the outlet conduit 135.

Each of the chambers A and C is provided with a target similar to the target 115 hereinbefore referred to. For example, the chamber A is provided with a target 137 in spaced relation to the intermediate wall 136 of the vessel 130, while the lower chamber C is provided with a target 138 which is positioned intermediate the center wall 136 and the bottom wall 132. It will be noted that the target 138 is closer to the bottom wall 132 than the distance between the intermediate wall 136 and the target 137.

The chamber A is provided with an upstanding blow pipe 139 which projects upwardly in the chamber to extend from closely spaced relation to the intermediate wall 136 into spaced relation to the target 137. An annular feeding space 140 is provided between the blow pipe 139 and the intermediate wall 136 for the same reason as the space 119 is provided in the embodiment of Figure 3. The intermediate wall 136 also carries a plurality of upstanding discharge tubes 141 which are arranged in spaced relation about the blow pipe 139 and which project through the intermediate wall 136 to join the chamber A to the chamber C.

The lower chamber C is provided with a central blow pipe 142 substantially identical with the blow pipe 139 and having an annular feeding space 143 therebeneath. The bottom wall 132 of the vessel 130 is also provided with a plurality of upstanding discharge tubes 144 which are arranged about the blow pipe 142 and which establish communication between the lower chamber C and the exterior of the vessel 130.

A stream of air, or similar buoyant fluid under pressure, is provided for introduction into each of the chambers from a centrifugal-type blower 145 which discharges through a single fluid conduit 146 into a pair of branched fluid pressure conduits 147 and 148 which are adapted to convey fluid under pressure to the chambers A and C, respectively. Each of the conduits 147 and 148 is joined to the respective frusto-conical bottom walls 136 and 132 of the chambers through vertical joining conduits 149, so that fluid under pressure of the blower is conducted through the conduit 146 to the conduits 147 and 148 for introduction in a countergravity direction upwardly through the blow pipes 139 and 142 against the superimposed targets 137 and 138, respectively. A manually or otherwise controlled valve 150 is provided in each of the conduits 147 and 148, so that the amount of air flow through the associated conduits may be controlled or entirely shut off if so desired. Also, the proportionate share of the blower output through either of the conduits 147 and 148 can be varied.

The operation of that embodiment of the invention shown in Figure 4 is substantially the same as that of Figure 3, with the exception that sand or similar granular material introduced into the vessel through a charging chute 151 is first subjected to the scrubbing action of the fluid stream passing upwardly through the blow pipe 139 for throwing the sand suspended in the fluid stream against the concave undersurface of the target 137. Spent gases are exhausted about the target 137 and upwardly through the outlet line 133 to the exhaust conduit 134, while sand or other particles dropping from the target 137 are recirculated into the fluid stream within the blow pipe 139 through the annular charging passage 140.

It will be appreciated that when the level of treated sand in the chamber A reaches the level of the top of the discharge tubes 141, the sand will drop through the discharge tubes into the chamber C wherein substantially the same scrubbing procedure is carried out, with sand being discharged through the discharge tubes 144 from the chamber A when the level of sand having been treated builds up to the level of the discharge tubes.

It will also be seen that sand or other granular material will make a plurality of passes upwardly through the blow pipes 139 and 142 in each of the chambers A and C prior to its discharge through the discharge tubes 141, inasmuch as the level of the sand in each of the chambers is constantly shifting due to the flow of sand through the annular charging passages 140 and 143 for admixture with the countergravity fluid stream. Further, that embodiment of Figure 4 provides a continuous process whereby a continued flow of sand through the charging chute 151 is accommodated by the constant drawing of treated sand through the discharge tubes 144 of the lower chamber C.

It may be noted that the apparatus of the present invention is very effective in cooling granular material and that hot material from a molding operation having a temperature of 350° to 400° F. is discharged from the apparatus substantially at room temperature.

It will be appreciated from the foregoing description that the method of the present invention broadly comprises impelling granular material against a target or granular material retained at a target, and controlling the velocity of impact of the granular material against the target and the number of repetitions of impact of the particles against the target to remove carbonaceous or non-carbonaceous material which may be adhering to the material. The number of repetitions of the treating cycle may be controlled in such a way as to remove only a portion of the coating and thereby reduce the amount of additions to the material prior to a subsequent molding operation.

The velocity of impact may also be controlled to make the granular material more rounded, or to roughen the surfaces of polished granular materials for improved adhesive properties.

The commercially attractive features of the design are:

(a) A sand reclamation unit in which the material is processed in the absence of any moving machinery, with air being the sole conveying, scrubbing and fines removal medium.

(b) The design of the equipment is such that the reclamation cost is about ½ of that of other now existent methods—the space requirements and the first cost is also ½ to ⅔ of that of competitive systems.

The present application is a continuation in-part of my copending application, Serial No. 216,163, filed March 17, 1951, and now abandoned.

It will be understood that many modifications and variations may be effected without departing from the scope of the novel concepts of the present invention.

I claim as my invention:

1. In an apparatus for treating granular foundry sand to be used in a foundry mold operation, means defining a treating chamber, a target within said chamber, vertically extending conduit means having an open upper end disposed below said target, sand collecting means including a bottom sand supporting surface located below said target and including passageway means extending from said supporting surface, a sand inlet for delivering sand to be treated into the said collecting means to form a mass of sand covering said supporting surface, a gas inlet defined in said passageway means below said supporting surface for providing fluid communication with the lower end of said conduit to direct a stream of gas vertically through said conduit and against said target, said sand mass creating a head of sand above said gas inlet having a pressure sufficient to cause entrainment of the sand particles in the vertically moving stream of gas for passage through said conduit means and impingement against said target, said target being shaped to direct the flow of particles in a direction generally reverse to said stream and into said sand collecting means for recycling through the conduit, a second vertical conduit spaced from said first conduit, a second target adjacent the upper end of said second conduit, second sand collecting means including a second bottom sand supporting surface and passageway means, an additional continuously open sand outlet in said first collecting means spaced from said sand inlet for delivering to said second collecting means sand which has been deflected from said first target, and a second gas inlet means defined in said second passageway means below said second supporting surface for creating a stream of gas in which is entrained sand from said second collecting means for passage through said second conduit and against said second target.

2. The apparatus defined by claim 1 wherein means are provided for controlling the rate of flow of sand from the sand inlet in order to control the number of recycling operations.

3. The apparatus defined by claim 1, wherein means are provided for adjusting the velocity of the gas stream in order to control the force of impingement of the sand particles in said gas stream against the target.

4. The apparatus defined by claim 1 wherein there is additionally provided a single blower and a common gas manifold in fluid communication with both said first and second conduits for establishing the gas streams in the first and second conduits.

5. A method of reclaiming foundry sand by removing foreign particles adhering thereto comprising the steps of directing an upwardly moving gas stream of confined cross section from a first point against a fixed target, continuously introducing sand containing said foreign particles at a second point below said target and above said first point to form a sand mass, passing the sand downwardly by gravity through said sand mass for entrainment in said upwardly moving gas stream in order to cause said sand to be projected against said target, causing treated sand to be deflected back into said sand mass and said foreign particles to be carried off by said gas stream, and continuously withdrawing a portion of said treated sand from said sand mass.

6. The method of claim 5 which includes the additional steps of recycling the sand deflected by said target through the sand mass and into the gas stream, and removing treated sand from said sand mass by gravity.

7. The method of claim 5 which includes the additional step of controlling the relative rate of introducing and removing sand from said mass in order to control the number of recycling operations.

8. A method of reclaiming foundry sand by removing foreign particles adhering thereto which comprises the steps of establishing first and second vertically and upwardly moving gas streams of confined cross section, directing the respective gas streams against first and second fixed targets from respective points and then passing each stream outwardly and upwardly from its associated target, collecting first and second sand masses respectively disposed below said first and second targets and above said respective points, introducing sand to be treated into the first sand mass, moving the sand to be treated from said first sand mass into entrainment within said first upwardly moving gas stream for impingement against said first target and deflection back into said first sand mass, passing treated sand from said first sand mass after deflection from said target to said second sand mass, moving the sand in said second mass into entrainment within said second gas stream for impingement against said second target and deflection back into said second sand mass, and removing treated sand from said second mass after deflection from said second target by gravity, and causing said foreign particles to be carried off by said gas stream.

9. The method defined by claim 8 which includes the additional steps of recycling the sand deflected by said first target through the first sand mass and into the first gas stream, recycling the sand deflected by the second target through the second sand mass and into the second gas stream, and controlling the relative rates of introducing sand to the first sand mass and removing the sand from the second sand mass in order to control the number of recycling operations.

References Cited in the file of this patent

UNITED STATES PATENTS

| | | |
|---|---|---|
| 1,700,713 | Campion et al. | Jan. 29, 1929 |
| 1,971,092 | Anger | Aug. 21, 1934 |
| 2,055,385 | Noack | Sept. 22, 1936 |
| 2,072,492 | Anger | Mar. 2, 1937 |
| 2,478,461 | Connolly | Aug. 9, 1949 |

FOREIGN PATENTS

| | | |
|---|---|---|
| 533,310 | Germany | Oct. 8, 1931 |